US012615562B2

(12) United States Patent
Xu et al.

(10) Patent No.: US 12,615,562 B2
(45) Date of Patent: Apr. 28, 2026

(54) METHOD FOR ADJUSTING CELL MEASUREMENT, USER EQUIPMENT, AND STORAGE MEDIUM

(71) Applicant: GUANGDONG OPPO MOBILE TELECOMMUNICATIONS CORP., LTD., Dongguan (CN)

(72) Inventors: Xin Xu, Palo Alto, CA (US); Yongsheng Shi, Palo Alto, CA (US)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 703 days.

(21) Appl. No.: 17/936,094

(22) Filed: Sep. 28, 2022

(65) Prior Publication Data
US 2023/0027243 A1     Jan. 26, 2023

Related U.S. Application Data

(63) Continuation of application No. PCT/CN2021/086000, filed on Apr. 8, 2021.

(60) Provisional application No. 63/006,444, filed on Apr. 7, 2020.

(51) Int. Cl.
*H04W 36/00*       (2009.01)
*H04W 36/08*       (2009.01)
*H04W 76/20*       (2018.01)

(52) U.S. Cl.
CPC . *H04W 36/0058* (2018.08); *H04W 36/00837* (2018.08); *H04W 36/08* (2013.01); *H04W 76/20* (2018.02)

(58) Field of Classification Search
CPC ....... H04W 36/0058; H04W 36/00837; H04W 36/08; H04W 36/22; H04W 76/20; H04W 48/06
See application file for complete search history.

(56) References Cited

U.S. PATENT DOCUMENTS

| | | | | | |
|---|---|---|---|---|---|
| 9,503,921 B2 * | 11/2016 | Luo | | | H04W 24/04 |
| 10,979,948 B2 * | 4/2021 | Cao | | | H04W 36/0016 |
| 11,064,411 B2 * | 7/2021 | Wang | | | H04W 76/10 |
| 11,564,072 B2 * | 1/2023 | Lee | | | H04W 28/26 |

(Continued)

FOREIGN PATENT DOCUMENTS

| | | |
|---|---|---|
| CN | 103379572 | 10/2013 |
| CN | 103546929 | 1/2014 |

(Continued)

OTHER PUBLICATIONS

Sony, "Potential handover enhancements for aerial UE", 3GPP TSG-RAN WG2 Meeting #101, R2-1803138, Feb. 2018.

(Continued)

*Primary Examiner* — Sujoy K Kundu
*Assistant Examiner* — Vladislav Y Agureyev
(74) *Attorney, Agent, or Firm* — Hodgson Russ LLP

(57) ABSTRACT
A method for adjusting cell measurement, a user equipment (UE), and a storage medium are provided. The method includes: determining wireless communication throughput of the UE is lower than a threshold, and adjusting a cell measurement result of a serving cell, where the adjusted cell measurement result is used to steer the UE to a neighbor cell.

18 Claims, 9 Drawing Sheets

(56) References Cited

U.S. PATENT DOCUMENTS

| | | | | |
|---|---|---|---|---|
| 2011/0110251 | A1* | 5/2011 | Krishnamurthy ... | H04W 72/541 370/252 |
| 2011/0116395 | A1 | 5/2011 | Tsuda | |
| 2014/0213259 | A1* | 7/2014 | Teyeb | H04W 36/0094 455/436 |
| 2015/0304889 | A1* | 10/2015 | Qian | H04W 72/569 370/235 |
| 2015/0327133 | A1* | 11/2015 | Yiu | H04W 36/0085 455/436 |
| 2015/0358477 | A1* | 12/2015 | Jeong | H04M 15/56 370/259 |
| 2016/0088539 | A1* | 3/2016 | Zingler | H04W 36/08 455/436 |
| 2016/0192376 | A1* | 6/2016 | Lee | H04W 48/20 370/252 |
| 2016/0269944 | A1* | 9/2016 | Li | H04W 36/0061 |
| 2016/0353330 | A1* | 12/2016 | Naik | H04L 65/1016 |
| 2016/0381610 | A1 | 12/2016 | Pu et al. | |
| 2017/0012792 | A1* | 1/2017 | Chang | H04W 36/22 |
| 2017/0041821 | A1* | 2/2017 | Uchiyama | H04W 84/10 |
| 2017/0171786 | A1* | 6/2017 | Mochizuki | H04W 36/00835 |
| 2017/0215184 | A1* | 7/2017 | Chang | H04L 5/0035 |
| 2017/0238323 | A1* | 8/2017 | Marinier | H04B 7/0626 370/329 |
| 2017/0289889 | A1* | 10/2017 | Sahu | H04W 24/10 |
| 2017/0347263 | A1* | 11/2017 | Dutta | H04L 63/0853 |
| 2017/0367011 | A1* | 12/2017 | Ekemark | H04W 28/0861 |
| 2018/0049078 | A1* | 2/2018 | Yang | H04W 8/245 |
| 2018/0227822 | A1* | 8/2018 | Lin | H04W 36/302 |
| 2018/0288666 | A1* | 10/2018 | Fujishiro | H04W 48/20 |
| 2018/0316690 | A1* | 11/2018 | Cho | H04W 12/106 |
| 2018/0368037 | A1* | 12/2018 | Wang | H04L 43/0888 |
| 2019/0342783 | A1* | 11/2019 | Kim | H04W 24/08 |
| 2020/0154324 | A1* | 5/2020 | Ozturk | H04W 36/305 |
| 2020/0329529 | A1* | 10/2020 | Tsai | H04W 28/0268 |
| 2020/0344635 | A1* | 10/2020 | Lu | H04W 76/15 |
| 2020/0413315 | A1* | 12/2020 | Palenius | H04W 36/302 |
| 2020/0413392 | A1* | 12/2020 | Purkayastha | H04W 74/0833 |
| 2021/0007025 | A1* | 1/2021 | Kumar | H04W 48/20 |
| 2021/0037433 | A1* | 2/2021 | Lee | H04W 24/10 |
| 2021/0136606 | A1* | 5/2021 | Jia | H04W 56/00 |
| 2021/0168678 | A1* | 6/2021 | Deenoo | H04W 24/08 |
| 2021/0168691 | A1* | 6/2021 | Lee | H04W 36/328 |
| 2021/0204301 | A1* | 7/2021 | Lee | H04W 72/566 |
| 2021/0250834 | A1* | 8/2021 | Cirkic | H04W 36/00 |
| 2021/0258865 | A1* | 8/2021 | Park | H04W 48/16 |
| 2021/0392525 | A1* | 12/2021 | Kaikkonen | H04B 7/0695 |
| 2022/0022119 | A1* | 1/2022 | Sai | H04W 36/0009 |
| 2022/0078746 | A1* | 3/2022 | Lee | H04W 64/003 |
| 2022/0110041 | A1* | 4/2022 | Mattam | H04W 36/302 |
| 2022/0116839 | A1* | 4/2022 | Tseng | H04W 36/0061 |
| 2022/0201581 | A1* | 6/2022 | Li | H04W 36/304 |
| 2022/0225222 | A1* | 7/2022 | Lou | H04W 4/022 |
| 2022/0400420 | A1* | 12/2022 | Johansson | H04B 7/088 |
| 2022/0417804 | A1* | 12/2022 | Freda | H04W 36/30 |
| 2022/0417819 | A1* | 12/2022 | Cui | H04W 36/305 |
| 2023/0284018 | A1* | 9/2023 | Wallentin | H04W 36/0038 726/4 |
| 2023/0397072 | A1* | 12/2023 | Prabhakar | H04L 69/322 |
| 2024/0187943 | A1* | 6/2024 | Murugan | H04W 36/0058 |
| 2026/0019890 | A1* | 1/2026 | Purkayastha | H04W 36/0094 |

FOREIGN PATENT DOCUMENTS

| | | | | | |
|---|---|---|---|---|---|
| CN | 111866973 | A | * | 10/2020 | H04W 36/0058 |
| CN | 112203329 | B | * | 4/2023 | H04W 28/065 |
| EP | 2466946 | A1 | * | 6/2012 | H04W 48/16 |
| EP | 3442254 | A1 | * | 2/2019 | H04W 24/08 |
| EP | 3471456 | A1 | * | 4/2019 | H04W 24/10 |
| EP | 3589064 | A1 | * | 1/2020 | H04W 76/20 |
| EP | 3726891 | A1 | * | 10/2020 | H04W 48/18 |
| KR | 20160131058 | A | * | 11/2016 | H04W 36/0083 |
| WO | WO-2011044559 | A1 | * | 4/2011 | G01S 5/0252 |
| WO | WO-2017080514 | A1 | * | 5/2017 | H04W 36/08 |
| WO | WO-2018227632 | A1 | * | 12/2018 | H04W 24/10 |
| WO | WO-2019195060 | A1 | * | 10/2019 | H04W 24/08 |
| WO | WO-2021062763 | A1 | * | 4/2021 | H04W 4/022 |

OTHER PUBLICATIONS

WIPO, International Search Report and Written Opinion for International Application No. PCT/CN2021/086000, Jun. 28, 2021.

* cited by examiner

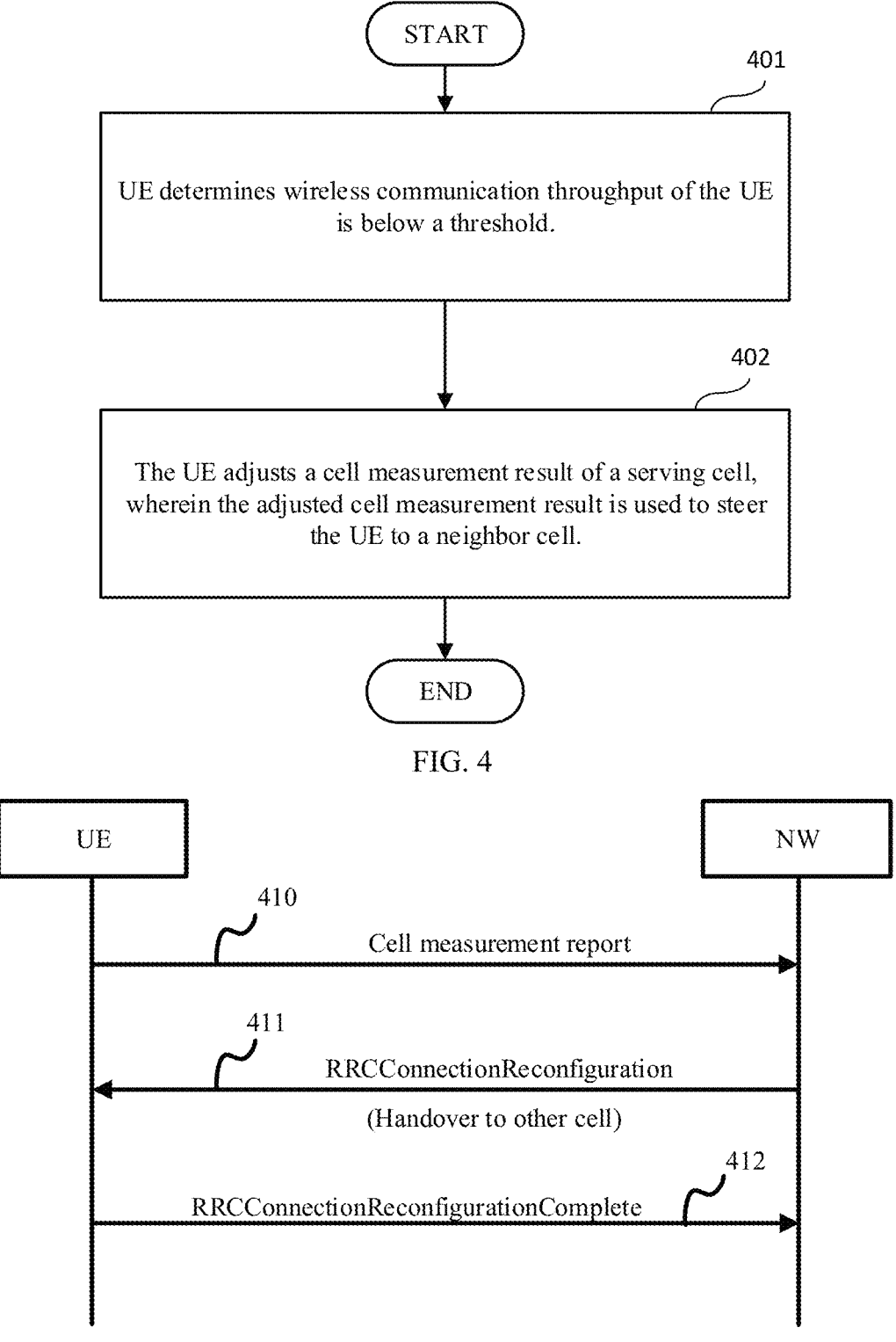

START

401

UE determines wireless communication throughput of the UE is below a threshold.

402

The UE adjusts a cell measurement result of a serving cell, wherein the adjusted cell measurement result is used to steer the UE to a neighbor cell.

END

Cell measurement report

411

RRCConnectionReconfiguration (Handover to other cell)

412

RRCConnectionReconfigurationComplete

FIG. 5

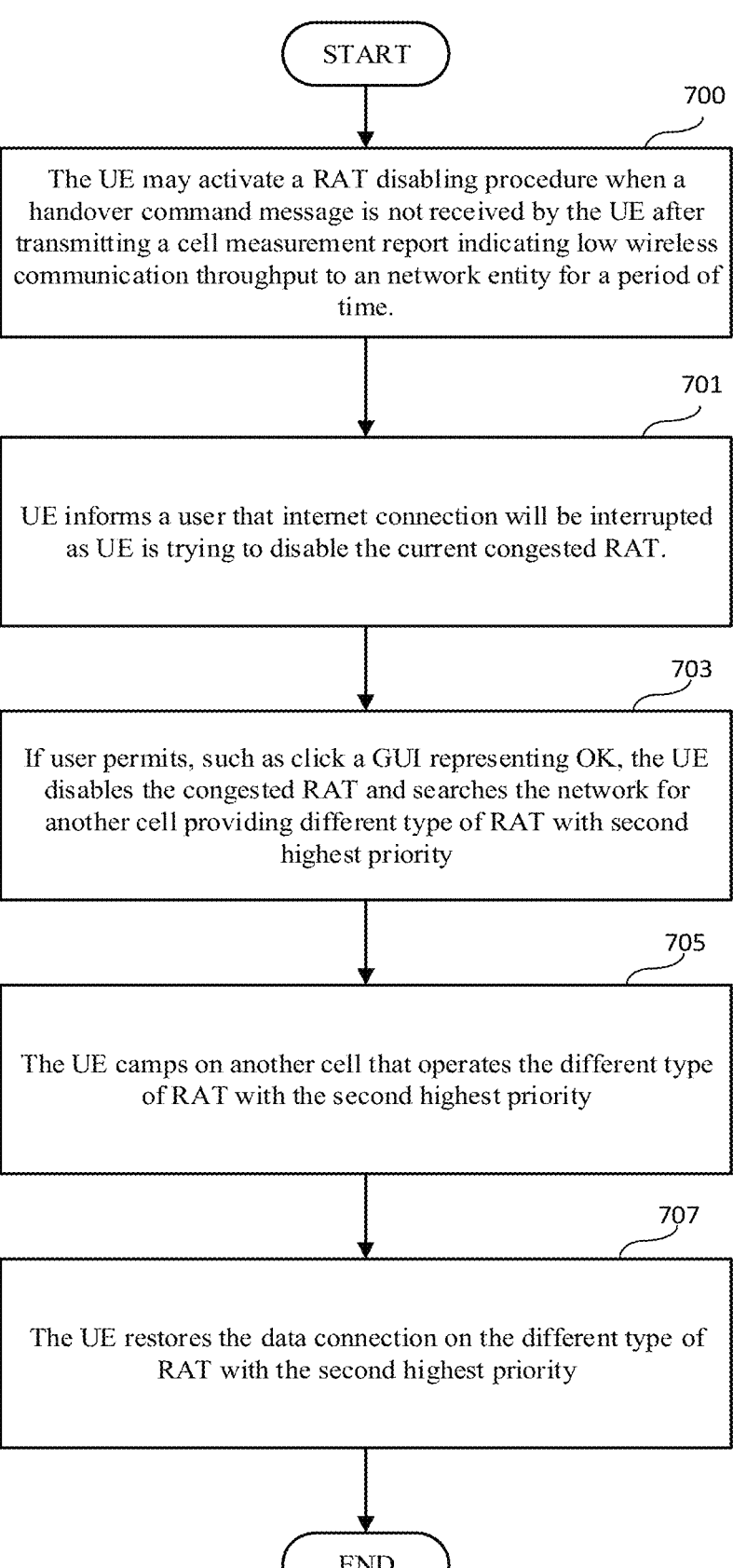

START

700

The UE may activate a RAT disabling procedure when a handover command message is not received by the UE after transmitting a cell measurement report indicating low wireless communication throughput to an network entity for a period of time.

701

UE informs a user that internet connection will be interrupted as UE is trying to disable the current congested RAT.

703

If user permits, such as click a GUI representing OK, the UE disables the congested RAT and searches the network for another cell providing different type of RAT with second highest priority

705

The UE camps on another cell that operates the different type of RAT with the second highest priority

707

The UE restores the data connection on the different type of RAT with the second highest priority

END

FIG. 7

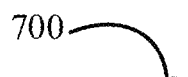
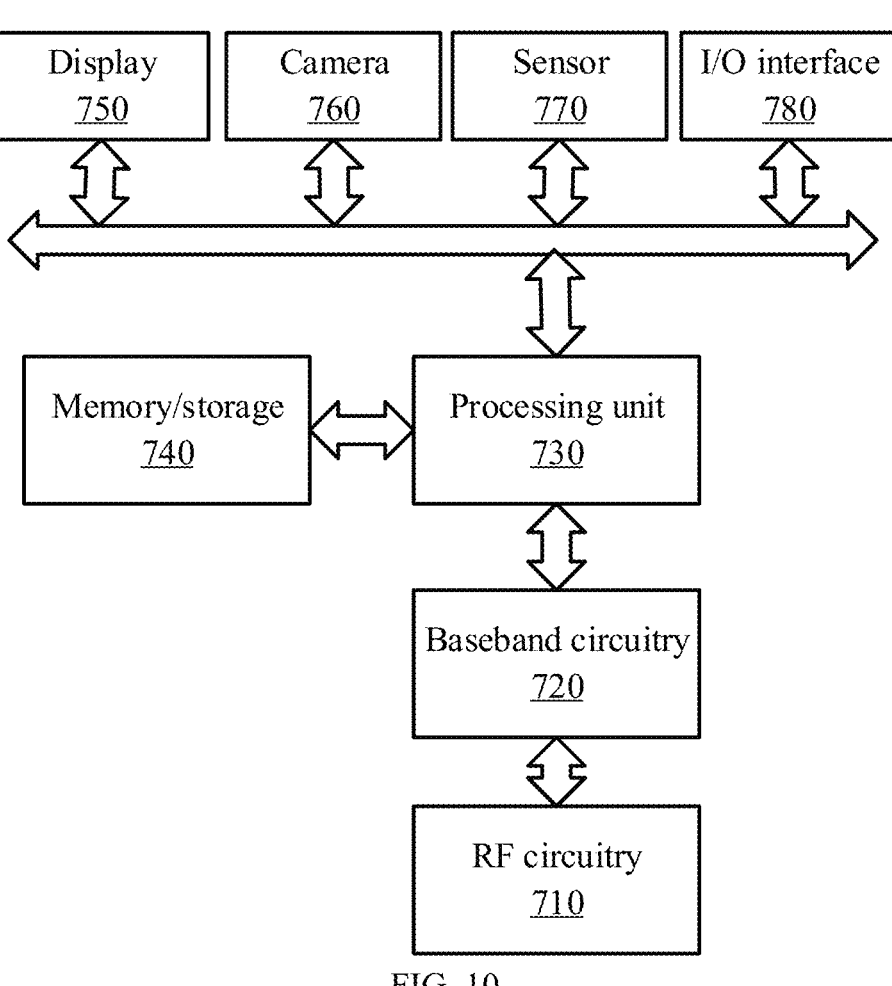
FIG. 10

METHOD FOR ADJUSTING CELL MEASUREMENT, USER EQUIPMENT, AND STORAGE MEDIUM

CROSS REFERENCE TO RELATED APPLICATION(S)

This application is a continuation of International Application No. PCT/CN2021/086000, filed Apr. 8, 2021, which claims priority to U.S. Provisional Application No. 63/006, 444, filed Apr. 7, 2020, the entire disclosures of which are incorporated herein by reference.

TECHNICAL FIELD

The present disclosure relates to the field of communication systems, and more particularly, to a method for adjusting cell measurement, a user equipment (UE), and a storage medium.

BACKGROUND ART

Wireless communication systems, such as the third-generation (3G) of mobile telephone standards and technology are well known. Such 3G standards and technology have been developed by the Third Generation Partnership Project (3GPP). The 3rd generation of wireless communications has generally been developed to support macro-cell mobile phone communications. Communication systems and networks have developed towards being a broadband and mobile system. In cellular wireless communication systems, user equipment (UE) is connected by a wireless link to a radio access network (RAN). The RAN comprises a set of base stations (BSs) that provide wireless links to the UEs located in cells covered by the base station, and an interface to a core network (CN) which provides overall network control. As will be appreciated the RAN and CN each conduct respective functions in relation to the overall network. The 3rd Generation Partnership Project has developed the so-called Long Term Evolution (LTE) system, namely, an Evolved Universal Mobile Telecommunication System Territorial Radio Access Network, (E-UTRAN), for a mobile access network where one or more macro-cells are supported by a base station known as an eNodeB or eNB (evolved NodeB). More recently, LTE is evolving further towards the so-called 5G or NR (new radio) systems where one or more cells are supported by a base station known as a gNB.

People are increasingly use a cellular network to communicate with data network and the Internet. Data throughput is the key factor to communication quality of service (QoS).

A leap on cellular technology from one generation (G) to a next generation, such as from 3G to 4G, or from 4G to 5G, is supposed to bring at least ten times throughput to end users. An operator typically configures a telecommunication network to keep a UE staying on a cell of highest generation and provide good throughput.

The network configuration, however, may overload a cell in some scenarios and cause throughput decay in the overloaded cell. Hence, a method to address the problems related to cell measurement and network configuration is desired.

SUMMARY

A first aspect of the disclosure provides a method for adjusting cell measurement executable in a user equipment (UE), comprising:

determining wireless communication throughput of the UE is lower than a threshold; and adjusting a cell measurement result of a serving cell, wherein the adjusted cell measurement result is used to steer the UE to a neighbor cell when wireless communication throughput of the UE is lower than the threshold.

A second aspect of the disclosure provides a user equipment (UE), comprising a processor configured to execute the following steps:

determining wireless communication throughput of the UE is lower than a threshold; and adjusting a cell measurement result of a serving cell, wherein the adjusted cell measurement result is used to steer the UE to a neighbor cell when wireless communication throughput of the UE is lower than the threshold.

A third aspect of the disclosure provides a non-volatile computer readable storage medium, in which a computer program is stored, wherein the computer program causes a computer to execute the following steps:

determining wireless communication throughput of the UE is lower than a threshold; and adjusting a cell measurement result of a serving cell, wherein the adjusted cell measurement result is used to steer the UE to a neighbor cell.

DESCRIPTION OF DRAWINGS

In order to more clearly illustrate the embodiments of the present disclosure or related art, the following figures will be described in the embodiments are briefly introduced. It is obvious that the drawings are merely some embodiments of the present disclosure, a person having ordinary skill in this field can obtain other figures according to these figures without paying the premise.

FIG. 4 illustrates a schematic view showing an embodiment of the disclosed method.

FIG. 5 illustrates a schematic view showing an example of triggering a UE handover through adjusting cell measurement results.

FIG. 7 illustrates a schematic view showing another embodiment of the disclosed method for RAT disabling.

FIG. 10 illustrates a schematic view showing a system for wireless communication according to an embodiment of the present disclosure.

DETAILED DESCRIPTION OF EMBODIMENTS

Embodiments of the disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

Advantageous Effects

The disclosure provides a method for adjusting cell measurement results to address the throughput decay problems. Even if cell measurement and network configuration direct to overloading on a serving cell and causes throughput decay, the method applies a cell specific offset or a RAT specific offset to one or more cell measurement results to deprioritizing the overloaded serving cell and/or a serving RAT. The method may further disable the serving RAT to trigger cell reselection.

Figure 1:
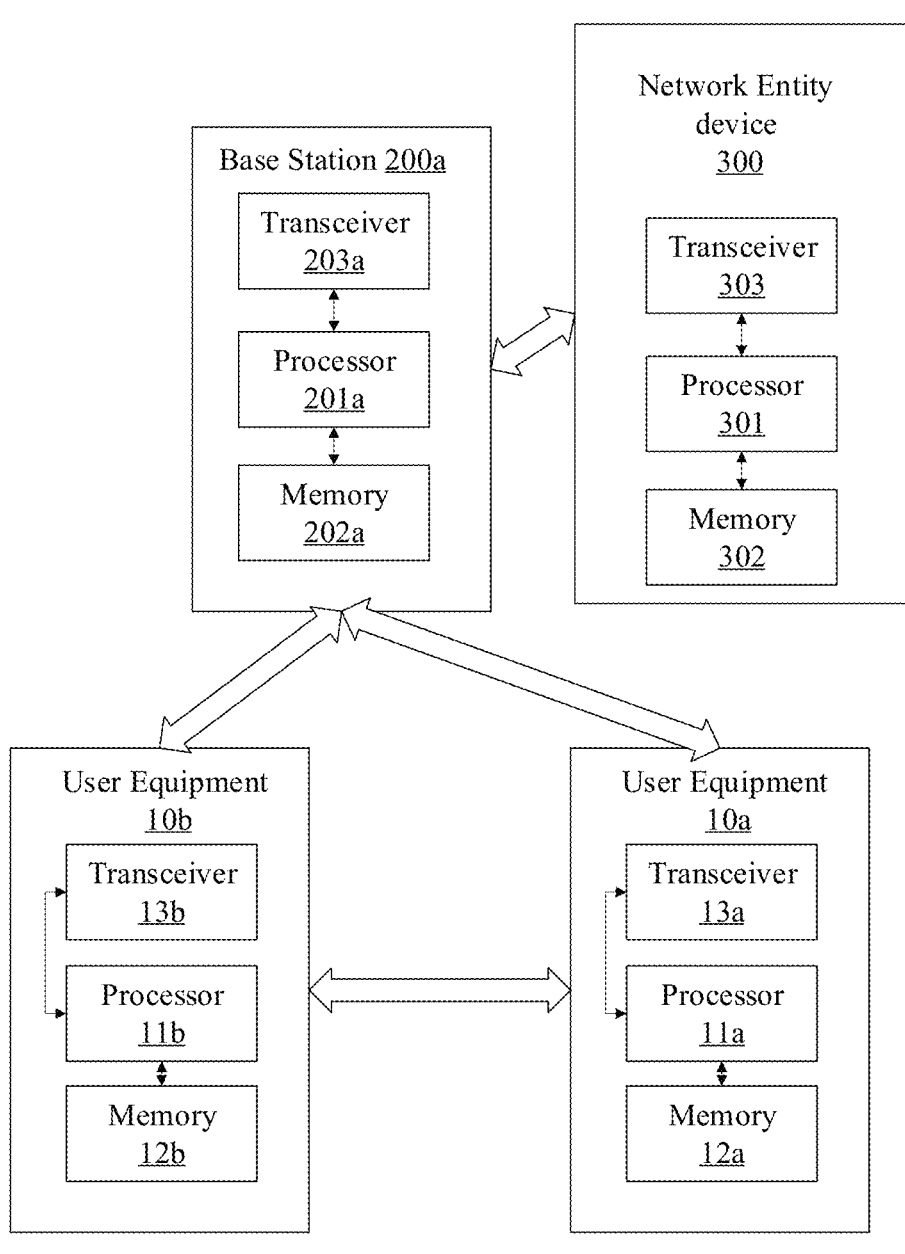
FIG. 1 illustrates a schematic view of a telecommunication system.

With reference to FIG. 1, a telecommunication system including a UE 10a, a UE 10b, a base station (BS) 200a, and a network entity device 300 executes the disclosed method according to an embodiment of the present disclosure. FIG. 1 is shown for illustrative not limiting, and the system may comprise more UEs, BSs, and CN entities. Connections between devices and device components are shown as lines and arrows in the FIGs. The UE 10a may include a processor 11a, a memory 12a, and a transceiver 13a. The UE 10b may include a processor 11b, a memory 12b, and a transceiver 13b. The base station 200a may include a processor 201a, a memory 202a, and a transceiver 203a. The network entity device 300 may include a processor 301, a memory 302, and a transceiver 303. Each of the processors 11a, 11b, 201a, and 301 may be configured to implement proposed functions, procedures and/or methods described in the description. Layers of radio interface protocol may be implemented in the processors 11a, 11b, 201a, and 301. Each of the memory 12a, 12b, 202a, and 302 operatively stores a variety of programs and information to operate a connected processor. Each of the transceivers 13a, 13b, 203a, and 303 is operatively coupled with a connected processor, transmits and/or receives radio signals or wireline signals. The UE 10a may be in communication with the UE 10b through a sidelink. The base station 200a may be an eNB, a gNB, or one of other types of radio nodes, and may configure radio resources and for the UE 10a and UE 10b.

Each of the processors 11a, 11b, 201a, and 301 may include application-specific integrated circuits (ASICs), other chipsets, logic circuits and/or data processing devices. Each of the memory 12a, 12b, 202a, and 302 may include a read-only memory (ROM), a random access memory (RAM), a flash memory, a memory card, a storage medium and/or other storage devices. Each of the transceivers 13a, 13b, 203a, and 303 may include baseband circuitry and radio frequency (RF) circuitry to process radio frequency signals. When the embodiments are implemented in software, the techniques described herein can be implemented with modules, procedures, functions, entities and so on, that perform the functions described herein. The modules can be stored in a memory and executed by the processors. The memory can be implemented within a processor or external to the processor, in which those can be communicatively coupled to the processor via various means are known in the art.

The network entity device 300 may be a node in a CN. CN may include LTE CN or 5G core (5GC) which includes user plane function (UPF), session management function (SMF), mobility management function (AMF), unified data management (UDM), policy control function (PCF), control plane (CP)/user plane (UP) separation (CUPS), authentication server (AUSF), network slice selection function (NSSF), and the network exposure function (NEF).

Figure 2:
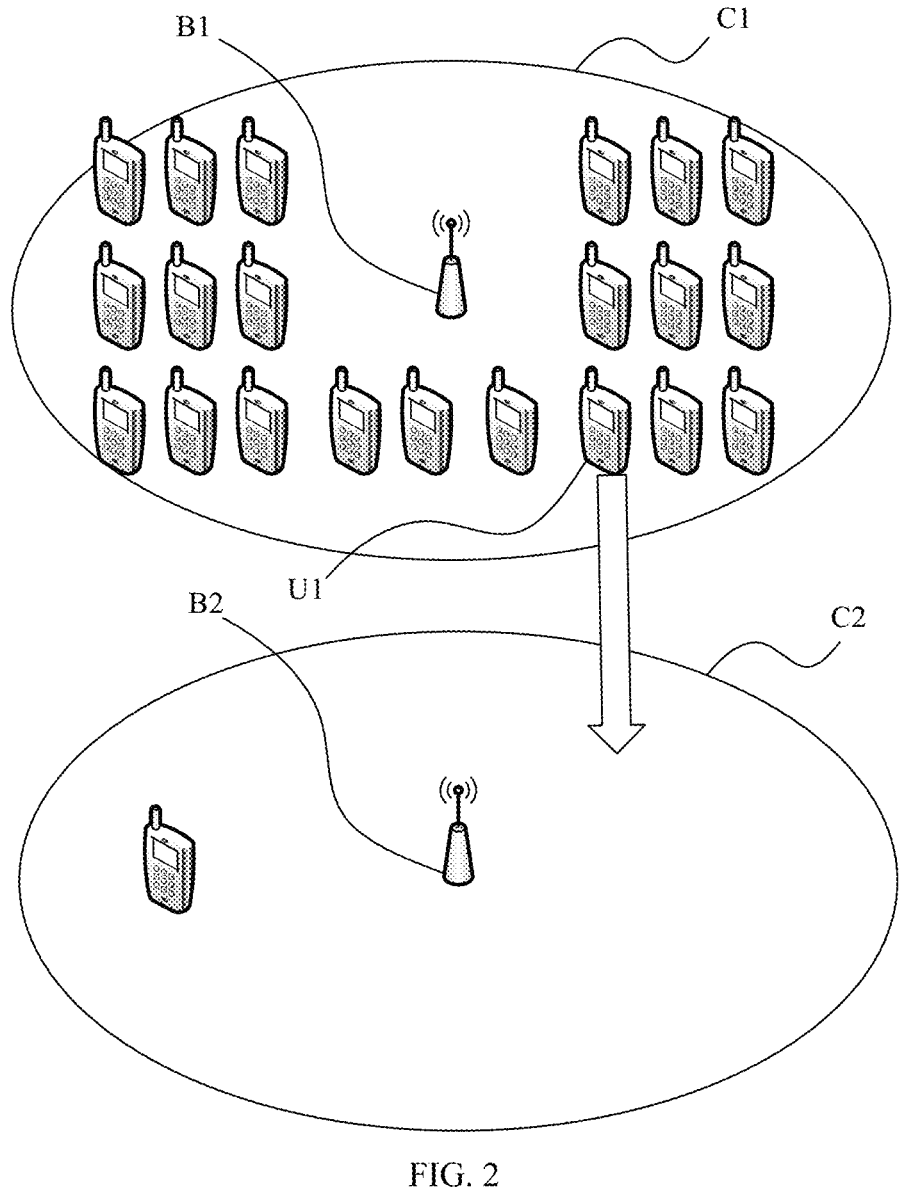
FIG. 2 illustrates a schematic view showing an example of UE steering from a serving cell to a neighbor cell.
Figure 3:
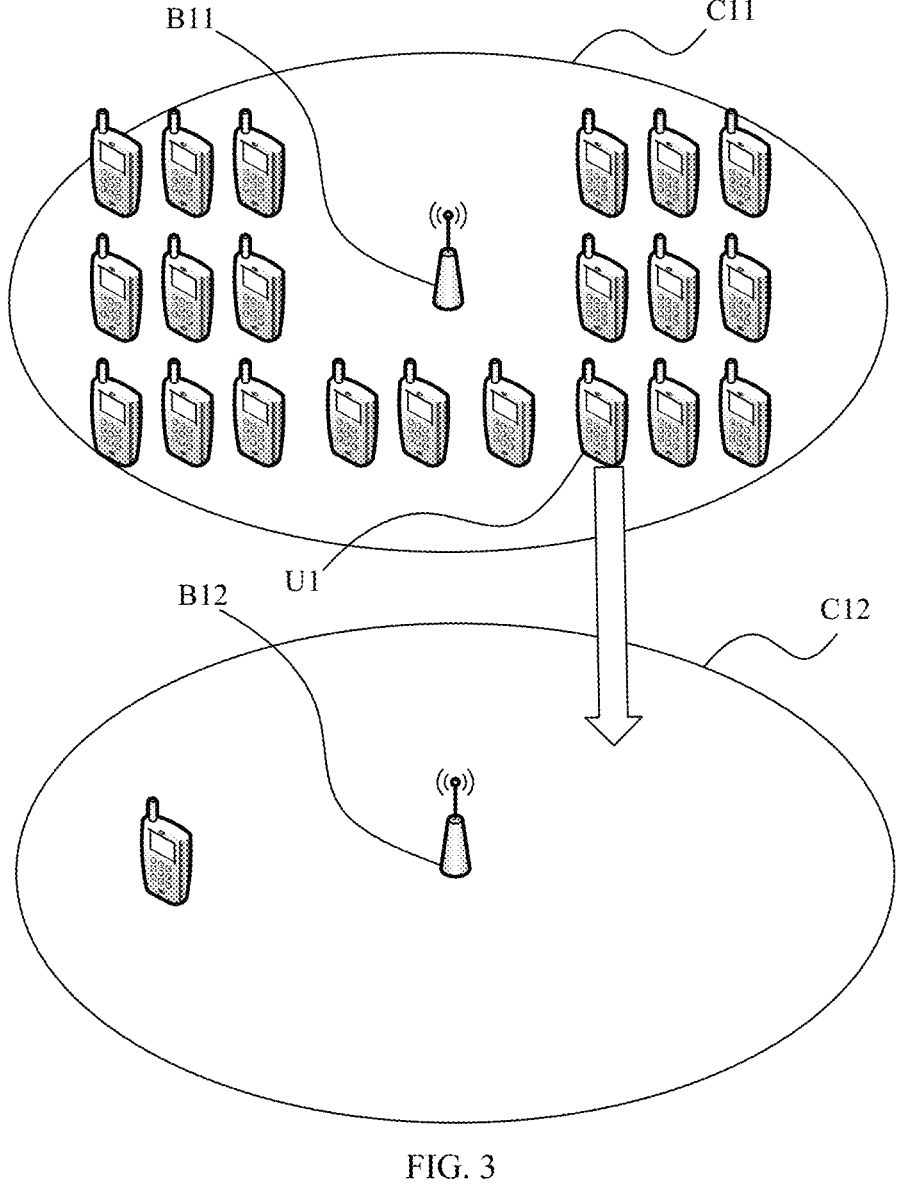
FIG. 3 illustrates a schematic view showing another example of UE steering from a serving cell to a neighbor cell.

With reference to FIG. 2 and FIG. 3, an example of the UE in the description may include one of the UE 10a or UE 10b. An example of the base station in the description may include the base station 200a. Uplink (UL) transmission of a control signal or data may be a transmission operation from a UE to a base station. Downlink (DL) transmission of a control signal or data may be a transmission operation from a base station to a UE.

FIG. 2 shows an example where a serving cell C21 has good signal quality, and the network does not handover UE to other cells:

Case 1:

A cell C1 having a large number of UEs including a UE U1 in a highly crowded area, such as a subway station, a stadium, a concert, or a shopping center. The cell C1 is provided by a base station B1, and a cell C2 is provided by a base station B2. The cell C1 and cell C2 may provide different radio access technologies (RAT), where the cell C1 provide a first RAT of higher generation than a second RAT of the cell C2. For example, the cell C1 provides a 4G LTE RAT, and the cell C2 provides a 3G RAT. When 4G is assigned a higher priority RAT over the 3G, the cell C1 has higher priority than the cell C2. The UE U1 accordingly camps on the cell C1 having the higher priority. Because many UEs share bandwidth of Cell C1, the throughput per UE would be even lower than the cell C2 with lower priority RAT cell C2 serving fewer UEs. An embodiment of the disclosed method may trigger the UE to cell C2 to get better throughput.

Case 2:

With reference to FIG. 3, a cell C11 having a large number of UEs including the UE U1 in a highly crowed area. The cell C11 is provided by a base station B11, and a cell C12 is provided by a base station B12. The cell C11 and cell C12 may provide the same RAT while the cell C11 is at a first frequency band, and the cell C12 is at a second frequency band. For example, the cell C11 and the cell C12 both provides 4G LTE RAT at different frequency bands. The cell C11 has the same priority as the cell C12. The UE U1 originally camps on the cell C11. Because many UEs share bandwidth of cell C11, the throughput per UE would be even lower than the cell C12 serving fewer UEs. An embodiment of the disclosed method may trigger the UE to cell C12 to get better throughput.

The disclosed method allows one or more UEs to switch from a currently congested serving cell to a neighbor cell to get better throughput. The serving cell may provide the first RAT of higher priority than the second RAT of the neighbor cell. Alternatively, the serving cell and the neighbor cell may provide the same RAT at different frequency bands.

The invention includes cell deprioritizing, radio access technology (RAT) deprioritizing, and RAT disabling in a connected mode and an idle mode of a UE. The invention also provides an example of overall operation of the disclosed method. Embodiments of the disclosed method may work together to steer the UE U1, such as one of the UE 10a or UE 10b, from a congested cell to another cell, or from a congested RAT to another RAT and improve wireless communication throughput.

Cell Deprioritizing and RAT Deprioritizing in the UE Connected Mode and Idle Mode:

Embodiments of cell deprioritizing and RAT deprioritizing are given in the following.

Penalty Offset Value and Type

Embodiments of the disclosed method use at least two types of penalty offsets to adjust cell measurement as shown in Table 1:

5

TABLE 1

| Penalty Offset Type | Note |
| --- | --- |
| Cell specific offset | The offset applies to a cell |
| RAT specific offset | The offset applies to all cells of a serving RAT |

Specifically, a cell specific offset may be applied to a cell measurement result to realize cell deprioritizing, and a RAT specific offset may be applied to cell measurement results of cells belong to a congested RAT to realize RAT deprioritizing.

For example, values of the penalty offsets can be defined as shown in Table 2:

TABLE 2

| Penalty Offset Value (DB) | Note |
| --- | --- |
| +2 | +2 offset for cell measurement |
| +1 | +1 offset for cell measurement |
| 0 | No impact to a cell measurement result |
| −1 | −1 offset for cell measurement |
| −2 | −2 offset for cell measurement |

A UE, such as the UE U1, may apply an offset value to cell measurement result $M_{cell}$ obtained by the UE for the serving cell or all cells in the serving RAT in a connected mode and an idle mode, and generates an adjusted cell measurement result $M_{cell}'$ according to the following formula (1):

$$M_{cell}'=M_{cell}+\text{Penalty Offset} \tag{1}$$

$M_{cell}'$ is a cell measurement result obtained by the UE;
$M_{cell}'$ is the updated result after applying offset.

Note that the offset values can be empirically defined and dynamically changed. In an embodiment, the UE may select a penalty offset value for RAT deprioritizing to generate a lower adjusted cell measurement result, so that UE may be easier to report the required measurement report and handover.

Cell Deprioritizing and RAT Deprioritizing in the UE Connected Mode:

In the connected mode, the UE has established a connection with the network, and a data call may be ongoing. When detecting a low throughput event during the connected mode of the UE, the UE may apply a negative penalty offset to a cell measurement result of a serving cell obtained by the UE to steer UE away from the currently congested serving cell, or apply a negative penalty offset to cell measurement results of all cells of a serving RAT of the UE to steer UE away from the currently congested serving RAT. A serving cell or a serving RAT can thus be deprioritized by a negative penalty offset.

With reference to FIG. 4, the UE determines wireless communication throughput of the UE is lower than a threshold (block 401) and adjusts a cell measurement result of a serving cell, wherein the adjusted cell measurement result is used to steer the UE to a neighbor cell (block 402). The threshold is a specific threshold, which may comprise a cell specific threshold or a RAT specific threshold. In the adjusting the cell measurement result of the serving cell, the UE applies a specific offset to at least the cell measurement result of the serving cell.

6

Cell Deprioritizing in the Connected Mode:

In an embodiment of the disclosed method, the threshold may be a cell specific threshold for triggering cell deprioritizing, and the UE applies a cell specific offset to the cell measurement result of the serving cell to steer the UE to the neighbor cell when wireless communication throughput of the UE is lower than the cell specific threshold. The UE may apply a negative cell specific offset to a cell measurement result of a serving cell to generate an adjusted cell measurement result having a lower value.

As a result, the UE may trigger one of following measurement report event as defined in 3GPP 36.331 4G specification and 38.331 5G specification and send a measurement report to the network, so that the network handover the UE from a serving cell to another neighbor cell of the same RAT, and the neighbor cell become a new current serving cell of the UE:

Event A2: a serving cell becomes worse than an absolute cell measurement threshold;

Event A3: cell measurement of a neighbor cell becomes better than a serving cell, such as a PCell or a PSCell;

Event A5: a serving cell, such as a PCell or a PSCell becomes worse than an absolute cell measurement threshold, and cell measurement of a neighbor cell becomes better than another absolute cell measurement threshold.

With reference to FIG. 5, an example of cell deprioritizing is performed in a 4G LTE network. The UE transmits a cell measurement report comprising the cell measurement result adjusted by the cell specific offset to a network entity (step 410). The network entity sends radio resource control (RRC) connection reconfiguration to the UE in response to the cell measurement report. The RRC connection reconfiguration comprises a handover command message to steer the UE to the neighbor cell. The UE receives radio resource control (RRC) connection reconfiguration from the network entity (step 411) and transmits an RRC connection reconfiguration complete message to the network entity in response to the RRC connection reconfiguration (step 412).

RAT Deprioritizing in the Connected Mode:

In an embodiment of the disclosed method, the threshold may be a RAT specific threshold for triggering RAT deprioritizing, and the UE applies a RAT specific offset to cell measurement results of cells of a first type of RAT to steer the UE to a cell of a second type of RAT when wireless communication throughput of the UE on the first type of RAT is lower than the RAT specific threshold. The UE may apply a negative RAT specific offset to cell measurement results of a plurality of cells of a serving RAT to generate adjusted cell measurement results having lower values. RAT deprioritizing works similarly with cell deprioritizing, while a RAT specific offset is applicable to all cells of the serving RAT.

As a result, the UE may trigger one of the following measurement report events as defined in 3GPP 36.331 4G specification and 38.331 5G specification and send a measurement report to the network, so that the network handover the UE from a serving cell of a first type of RAT to another neighbor cell of a second type of RAT:

Event B2: cell measurement of a serving cell, such as a PCell, becomes worse than an absolute cell measurement threshold, and cell measurement of a neighbor cell becomes better than another absolute cell measurement threshold.

Cell Deprioritizing and RAT Deprioritizing in the Idle Mode

Figure 6:
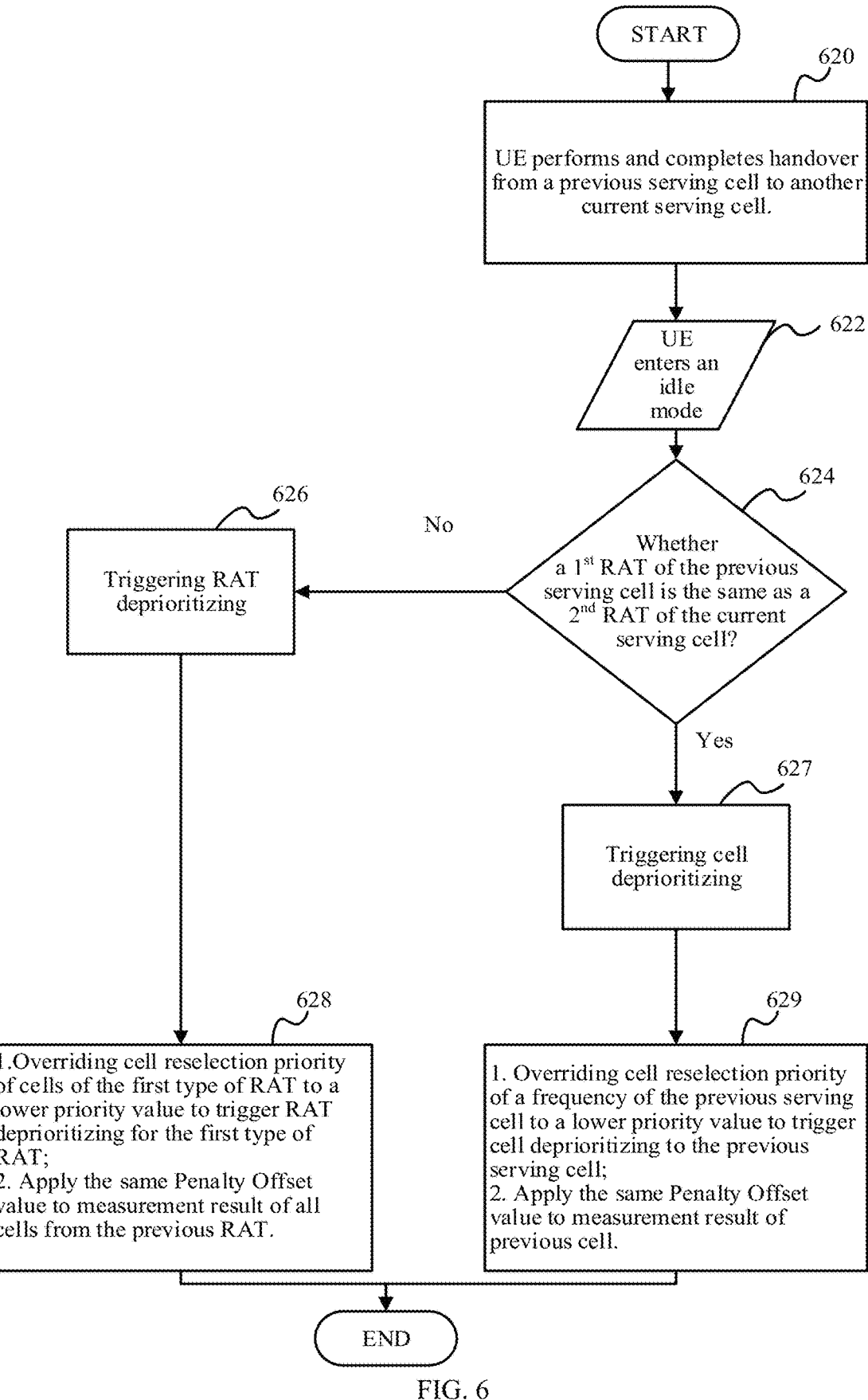
FIG. 6 illustrates a schematic view showing another embodiment of the disclosed method in a UE idle mode.

With reference to FIG. 6, after the UE performs and completes handover from a previous serving cell to another current serving cell and disconnects a data call (block 620), the UE transits back to the idle mode (block 622). The UE may perform idle mode cell measurements and cell reselection evaluation as mentioned in 3GPP standard 36.304 and 38.304 in the idle mode. In the handover operation, the UE may switch camping from the serving cell with high cell reselection priority to the neighbor cell with low cell reselection priority. When the UE completes a handover procedure from the serving cell to a neighbor cell, the serving cell may be referred to a previous serving cell, and the neighbor cell may be referred to as a current serving cell.

To prevent the UE from connecting back to a congested previous serving cell of high priority RAT after the handover, the following procedures are needed. The UE may perform either cell deprioritizing or RAT deprioritizing based on whether a congested high priority RAT of a previous serving cell of the UE is different from the RAT of a current serving cell of the UE.

The UE determines whether a first type of RAT of the previous serving cell is the same as a second type of RAT of the current serving cell (block 624). When the first type of RAT of the previous serving cell is different from the second type of RAT of the current serving cell, the UE triggers RAT deprioritizing (block 626). In the RAT deprioritizing, the UE overrides cell reselection priority of cells of the first type of RAT to a lower priority value to deprioritize the first type of RAT, and applies the same RAT specific offset to measurement results of all cells of the first RAT (Block 628).

When the first type of RAT of the previous serving cell is the same as the second type of RAT of the current serving cell, the UE triggers cell deprioritizing (block 627). In the cell deprioritizing, the UE overrides cell reselection priority of a frequency of the previous serving cell to a lower priority value to deprioritize for the previous serving cell, and applies a cell specific offset to a cell measurement result of the previous serving cell (Block 629).

Note that RAT disabling may be triggered to block the congested RAT and steer the UE to another RAT.

RAT Disabling—

When the UE reported an adjusted measurement report to the network, and the network does not trigger handover, the UE may disable the congested cell RAT directly and camp on a cell of another RAT. Since a data connection may be disconnected, the UE can inform a user that the data connection will be interrupted and reset, where some applications may need refresh or re-launch.

With reference to FIG. 7, The UE may activate a RAT disabling procedure when a handover command message is not received by the UE after transmitting a cell measurement report indicating low wireless communication throughput to a network entity for a period of time (block 700). The RAT Disabling may comprise the following operations:

1. UE informs a user that an internet connection will be interrupted as UE is trying to disable the current congested RAT (block 701). The UE may display a graphical user interface (GUI) to show that the RAT disabling procedure is suggested.

2. If user permits, such as click a GUI representing OK, the UE disables the congested RAT and searches the network for another cell providing different type of RAT with the second highest priority (block 703). It may take time for UE to camp on a network. The UE disables the congested RAT and searches a telecommunication network for the different type of RAT with the second highest priority in response to a user operation that permits disabling of the congested RAT.

3. The UE camps on another cell that operates the different type of RAT with the second highest priority (block 705);

4. The UE restores the data connection on the different type of RAT with the second highest priority (block 707).

Figure 8:
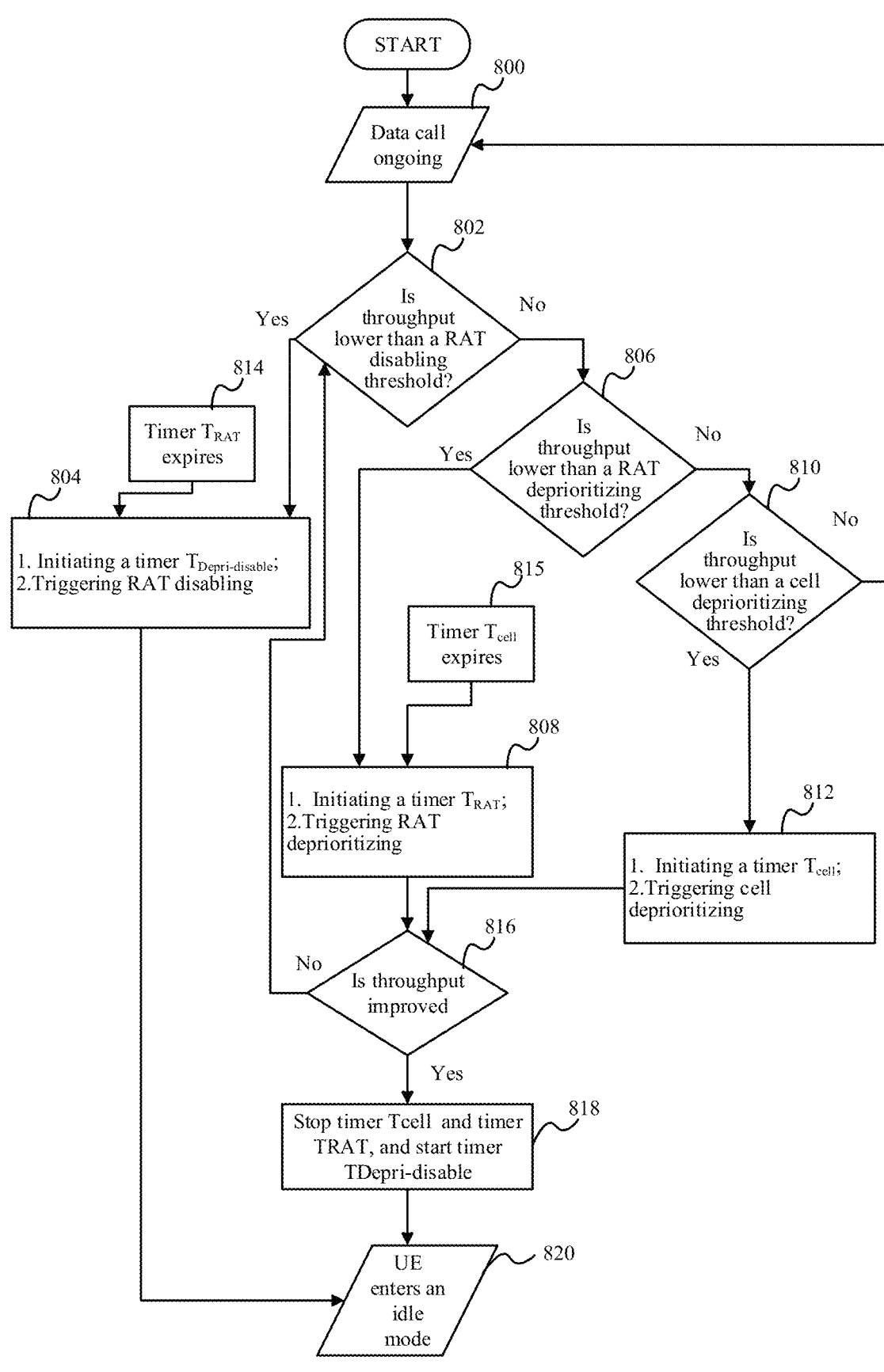
FIG. 8 illustrates a schematic view showing another embodiment of the disclosed method in a UE connected mode.

FIG. 8 shows an example of the disclosed method to address the low throughput issue using the cell/RAT deprioritizing and RAT Disabling.

In an embodiment of the disclosed method, timers and thresholds are defined in Table 3 and Table 4 to trigger cell/RAT deprioritizing and avoid ping-pong effects:

TABLE 3

| Thresholds | |
| --- | --- |
| Threshold Name | Notes |
| Cell deprioritizing threshold $Th_{Cell}$ | Throughput threshold to trigger Cell Deprioritizing (highest in the 3 thresholds) |
| RAT deprioritizing threshold $Th_{RAT}$ | Throughput threshold to trigger RAT Deprioritizing ($2^{nd}$ highest in the 3 thresholds) |
| RAT disabling threshold $Th_{RAT\text{-}disable}$ | Throughput threshold to trigger RAT Disabling (lowest in the 3 thresholds) |

TABLE 4

| Timers | | |
| --- | --- | --- |
| Timer Name | Notes | Expired Action |
| $T_{Cell}$ | Timer for cell deprioritizing to complete | Trigger next level action-RAT deprioritizing |
| $T_{RAT}$ | Timer for RAT deprioritizing to complete | Trigger next level action-RAT disabling |
| $T_{Depri\text{-}disable}$ | Timer for deprioritizing/ disabling | Reset the RAT/cell deprioritizing and RAT disabling applied before, and restore the RAT setting including cell measurement results with no penalty offset applied. The UE moves back to the cell with the highest priority RAT. |

The UE may execute operations as shown in the column of the expired action of the Table 4 upon expiration of the timers.

With reference to FIG. 8, in a non-idle mode, such as the connected mode, where a data call is ongoing (block 800), the UE determines whether wireless communication throughput between the UE and a serving cell of a first RAT is lower than the RAT disabling threshold $Th_{RAT\text{-}disable}$ (block 802). When the wireless communication throughput between the UE and the serving cell of the first RAT is lower than the RAT disabling threshold $Th_{RAT\text{-}disable}$, the UE initiates the timer $T_{Depri\text{-}disable}$ for deprioritizing/disabling and performs RAT disabling as described in the aforementioned embodiments upon (block 804). The RAT disabling includes informing the user, getting user consent, and disabling the first RAT. When the data call is completed, the UE enters the idle mode (block 820). The UE may reset operations of the RAT/cell deprioritizing and RAT disabling, and restore the RAT setting including cell measurement results with no penalty offset applied in response to expiration of the timer $T_{Depri\text{-}disable}$. The UE moves back to the cell with the highest priority RAT.

When the wireless communication throughput between the UE and the serving cell of the first RAT is not lower than the RAT disabling threshold $Th_{RAT\text{-}disable}$, the UE determines whether the wireless communication throughput between the UE and the serving cell of the first RAT is lower than the RAT deprioritizing threshold $Th_{RAT}$ (block 806). When the wireless communication throughput between the UE and the serving cell of the first RAT is lower than the RAT deprioritizing threshold $Th_{RAT}$, the UE initiates the timer $T_{RAT}$ for RAT deprioritizing and performs RAT deprioritizing as described in the aforementioned embodiments (block 808) and determines whether the throughput is improved (bock 816). The UE performs operations in block 804 upon expiration of the timer $T_{RAT}$. When the throughput has not been improved, the UE performs the operations in block 802. When the throughput has been improved, the UE stops the one or more timers (block 818). When the data call is completed, the UE enters the idle mode (block 820).

When the wireless communication throughput between the UE and the serving cell of the first RAT is not lower than the RAT deprioritizing threshold $Th_{RAT}$, the UE determines whether the wireless communication throughput between the UE and the serving cell of the first RAT is lower than the cell deprioritizing threshold $Th_{Cell}$ (block 810).

When the wireless communication throughput between the UE and the serving cell of the first RAT is lower than the cell deprioritizing threshold $Th_{Cell}$, the UE initiates the timer $T_{Cell}$ for cell deprioritizing and performs cell deprioritizing as described in the aforementioned embodiments (block 812) and determines whether the throughput is improved (bock 816). The UE performs operations in block 808 upon expiration of the timer $T_{Cell}$. When the throughput has not been improved, the UE performs the operations in block 802. When the throughput has been improved, the UE stops the one or more timers (block 818). When the data call is completed, the UE enters the idle mode (block 820).

When the wireless communication throughput between the UE and the serving cell of the first RAT is not lower than the cell deprioritizing threshold $Th_{Cell}$, the UE performs operations in the block 800.

Figure 9:
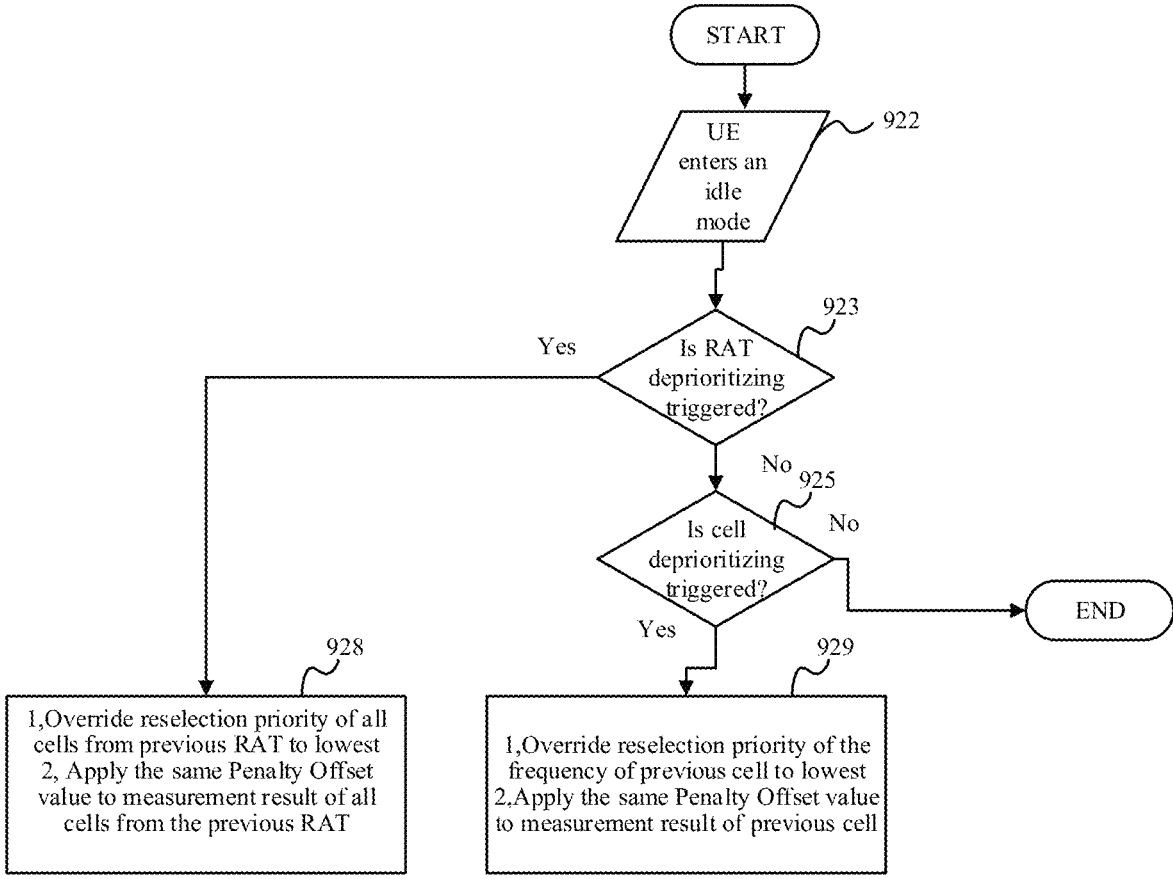
FIG. 9 illustrates a schematic view showing another embodiment of the disclosed method in the UE idle mode.

With reference to FIG. 9, when UE is in the idle mode (block 922). The UE may perform idle mode cell measurements and cell reselection evaluation as mentioned in 3GPP standard 36.304 and 38.304 in the idle mode.

The UE determines whether the RAT deprioritizing is triggered (block 923). When the RAT deprioritizing is triggered, the UE overrides cell reselection priority of cells of the first type of RAT to a lower priority value to deprioritize the first type of RAT, and applies the same RAT specific offset to measurement results of all cells of the first RAT (Block 928).

When the RAT deprioritizing is not triggered, the UE determines whether the cell deprioritizing is triggered (block 925). When the cell deprioritizing is triggered, the UE overrides cell reselection priority of a frequency of the previous serving cell to a lower priority value to deprioritize for the previous serving cell, and applies a cell specific offset to a cell measurement result of the previous serving cell (Block 929).

FIG. 10 is a block diagram of an example system 700 for wireless communication according to an embodiment of the present disclosure. Embodiments described herein may be implemented into the system using any suitably configured hardware and/or software. FIG. 10 illustrates the system 700 including a radio frequency (RF) circuitry 710, a baseband circuitry 720, a processing unit 730, a memory/storage 740, a display 750, a camera 760, a sensor 770, and an input/output (I/O) interface 780, coupled with each other as illustrated.

The processing unit 730 may include a circuitry, such as, but not limited to, one or more single-core or multi-core processors. The processors may include any combinations of general-purpose processors and dedicated processors, such as graphics processors and application processors. The processors may be coupled with the memory/storage and configured to execute instructions stored in the memory/storage to enable various applications and/or operating systems running on the system.

The baseband circuitry 720 may include a circuitry, such as, but not limited to, one or more single-core or multi-core processors. The processors may include a baseband processor. The baseband circuitry may handle various radio control functions that enable communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with 5G NR, LTE, an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry. In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency.

The RF circuitry 710 may enable communication with wireless networks using modulated electromagnetic radiation through a non-solid medium. In various embodiments, the RF circuitry may include switches, filters, amplifiers, etc. to facilitate the communication with the wireless network. In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the UE, eNB, or gNB may be embodied in whole or in part in one or more of the RF circuitries, the baseband circuitry, and/or the processing unit. As used herein, "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules. In some embodiments, some or all of the constituent components of the baseband circuitry, the processing unit, and/or the memory/storage may be implemented together on a system on a chip (SOC).

The memory/storage 740 may be used to load and store data and/or instructions, for example, for the system. The memory/storage for one embodiment may include any combination of suitable volatile memory, such as dynamic random access memory (DRAM)), and/or non-volatile memory, such as flash memory. In various embodiments, the I/O interface 780 may include one or more user interfaces designed to enable user interaction with the system and/or peripheral component interfaces designed to enable periph- eral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, the sensor 770 may include one or more sensing devices to determine environmental condi- tions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global posi- tioning system (GPS) satellite. In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, etc. In various embodiments, the system may have more or less components, and/or different architectures. Where appropriate, the methods described herein may be imple- mented as a computer program. The computer program may be stored on a storage medium, such as a non-transitory storage medium.

The embodiment of the present disclosure is a combina- tion of techniques/processes that can be adopted in 3GPP specification to create an end product.

A person having ordinary skill in the art understands that each of the units, algorithm, and steps described and dis- closed in the embodiments of the present disclosure are realized using electronic hardware or combinations of soft- ware for computers and electronic hardware. Whether the functions run in hardware or software depends on the condition of application and design requirement for a tech- nical plan. A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basi- cally the same. For easy description and simplicity, these working processes will not be detailed.

It is understood that the disclosed system, device, and method in the embodiments of the present disclosure can be realized with other ways. The above-mentioned embodi- ments are exemplary only. The division of the units is merely based on logical functions while other divisions exist in realization. It is possible that a plurality of units or compo- nents are combined or integrated into another system. It is also possible that some characteristics are omitted or skipped. On the other hand, the displayed or discussed mutual coupling, direct coupling, or communicative cou- pling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. More- over, each of the functional units in each of the embodiments can be integrated into one processing unit, physically inde- pendent, or integrated into one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computa- tional device (such as a personal computer, a server, or a network device) to run all or some of the steps disclosed by the embodiments of the present disclosure. The storage medium includes a USB disk, a mobile hard disk, a read- only memory (ROM), a random access memory (RAM), a floppy disk, or other kinds of media capable of storing program codes.

The disclosure provides a method for adjusting cell mea- surement results to address the throughput decay problems. Even if cell measurement and network configuration direct to overloading on a serving cell and causes throughput decay, the method applies a cell specific offset or a RAT specific offset to one or more cell measurement results to deprioritizing the overloaded serving cell and/or a serving RAT. The method may further disable the serving RAT to trigger cell reselection.

While the present disclosure has been described in con- nection with what is considered the most practical and preferred embodiments, it is understood that the present disclosure is not limited to the disclosed embodiments but is intended to cover various arrangements made without departing from the scope of the broadest interpretation of the appended claims.

The invention claimed is:

1. A method for adjusting cell measurement executable in a user equipment (UE), comprising:

determining wireless communication throughput of the UE is lower than a threshold; and adjusting a cell measurement result of a serving cell, wherein the adjusted cell measurement result is used to steer the UE to a neighbor cell;

wherein adjusting the cell measurement result of the serving cell comprises:

applying a specific offset to the cell measurement result of the serving cell without applying the specific offset to a cell measurement result of the neighbor cell to steer the UE away from the serving cell to the neighbor cell, according to the following formula (1):

$$M_{cell}'=M_{cell}+\text{Penalty Offset} \tag{1}$$

wherein $M_{cell}'$ is the adjusted cell measurement result, $M_{cell}$ is the cell measurement result of the serving cell, and Penalty Offset is the specific offset;

wherein the method further comprises:

activating a RAT disabling procedure when a handover command message is not received by the UE after transmitting a cell measurement report indicating low wireless communication throughput to a net- work entity for a period of time.

2. The method for adjusting cell measurement of claim 1, wherein the threshold is a specific threshold.

3. The method for adjusting cell measurement of claim 2, wherein the specific threshold is a cell specific threshold for triggering cell deprioritizing, and adjusting the cell measurement result of the serving cell comprises:

applying a cell specific offset to the cell measurement result of the serving cell to steer the UE to the neighbor cell when wireless communication throughput of the UE is lower than the cell specific threshold.

4. The method for adjusting cell measurement of claim 3, further comprising:

transmitting the cell measurement report comprising the cell measurement result adjusted by the cell specific offset to the network entity;

receiving radio resource control (RRC) connection reconfiguration from the network entity, wherein the RRC connection reconfiguration comprises the handover command message to steer the UE to the neighbor cell; and transmitting an RRC connection reconfiguration complete message to the network entity.

5. The method for adjusting cell measurement of claim 2, wherein the specific threshold is a radio access technology (RAT) specific threshold for triggering RAT deprioritizing, and adjusting the cell measurement result of the serving cell comprises:

applying a RAT specific offset to cell measurement results of cells of a first type of RAT to steer the UE to a cell of a second type of RAT when wireless communication throughput of the UE on the first type of RAT is lower than the RAT specific threshold.

6. The method for adjusting cell measurement of claim 1, further comprising:

performing a handover procedure to handover the UE from the serving cell with high cell reselection priority to the neighbor cell with low cell reselection priority, and, after the handover procedure, the serving cell is referred to a previous serving cell, and the neighbor cell is referred to as a current serving cell.

7. The method for adjusting cell measurement of claim 6, wherein when the UE is in an idle mode, the method further comprises:

determining whether a first type of RAT of the previous serving cell is the same as a second type of RAT of the current serving cell;

overriding cell reselection priority of a frequency of the previous serving cell to a lower priority value to deprioritize the previous serving cell when the first type of RAT of the previous serving cell is the same as the second type of RAT of the current serving cell; and overriding cell reselection priority of cells of the first type of RAT to a lower priority value to deprioritize the first type of RAT when the first type of RAT of the previous serving cell is different from the second type of RAT of the current serving cell.

8. The method for adjusting cell measurement of claim 1, wherein the RAT disabling procedure comprises:

displaying a graphical user interface to show that the RAT disabling procedure is suggested;

disabling a congested RAT and searching a telecommunication network for a different type of RAT with second highest priority in response to a user operation that permit disabling of the congested RAT;

camping the UE on another cell that operates the different type of RAT with second highest priority; and restoring data connection on the different type of RAT.

9. A user equipment (UE), comprising:

a processor; and a memory configured to store instructions which, when executed by the processor, cause the processor to execute the following steps:

determining wireless communication throughput of the UE is lower than a threshold; and adjusting a cell measurement result of a serving cell, wherein the adjusted cell measurement result is used to steer the UE to a neighbor cell;

wherein the processor further executes:

applying a specific offset to the cell measurement result of the serving cell without applying the specific offset to a cell measurement result of the neighbor cell to steer the UE away from the serving cell to the neighbor cell, according to the following formula (1):

$$M_{cell}' = M_{cell} + \text{Penalty Offset} \qquad (1)$$

wherein $M_{cell}'$ is the adjusted cell measurement result, $M_{cell}$ is the cell measurement result of the serving cell, and Penalty Offset is the specific offset;

wherein the processor further executes:

activating a RAT disabling procedure when a handover command message is not received by the UE after transmitting a cell measurement report indicating low wireless communication throughput to a network entity for a period of time.

10. The user equipment of claim 9, wherein the threshold is a specific threshold.

11. The user equipment of claim 10, wherein the specific threshold is a cell specific threshold for triggering cell deprioritizing, and the processor further executes:

applying a cell specific offset to the cell measurement result of the serving cell to steer the UE to the neighbor cell when wireless communication throughput of the UE is lower than the cell specific threshold.

12. The user equipment of claim 11, wherein the processor further executes:

transmitting the cell measurement report comprising the cell measurement result adjusted by the cell specific offset to the network entity;

receiving radio resource control (RRC) connection reconfiguration from the network entity, wherein the RRC connection reconfiguration comprises the handover command message to steer the UE to the neighbor cell; and transmitting an RRC connection reconfiguration complete message to the network entity.

13. The user equipment of claim 10, wherein the specific threshold is a radio access technology (RAT) specific threshold for triggering RAT deprioritizing, and the processor further executes:

applying a RAT specific offset to cell measurement results of cells of a first type of RAT to steer the UE to a cell of a second type of RAT when wireless communication throughput of the UE on the first type of RAT is lower than the RAT specific threshold.

14. The user equipment of claim 9, wherein the processor further executes:

performing a handover procedure to handover the UE from the serving cell with high cell reselection priority to the neighbor cell with low cell reselection priority, and, after the handover procedure, the serving cell is referred to a previous serving cell, and the neighbor cell is referred to as a current serving cell.

15. The user equipment of claim 14, wherein when the UE is in an idle mode, the processor further executes:

determining whether a first type of RAT of the previous serving cell is the same as a second type of RAT of the current serving cell;

overriding cell reselection priority of a frequency of the previous serving cell to a lower priority value to deprioritize the previous serving cell when the first type of RAT of the previous serving cell is the same as the second type of RAT of the current serving cell; and overriding cell reselection priority of cells of the first type of RAT to a lower priority value to deprioritize the first type of RAT when the first type of RAT of the previous serving cell is different from the second type of RAT of the current serving cell.

16. The user equipment of claim 9, wherein the RAT disabling procedure comprises:

displaying a graphical user interface to show that the RAT disabling procedure is suggested;

disabling a congested RAT and searching a telecommunication network for a different type of RAT with second highest priority in response to a user operation that permit disabling of the congested RAT;

camping the UE on another cell that operates the different type of RAT with second highest priority; and restoring data connection on the different type of RAT.

17. A non-transitory computer readable storage medium having a computer program stored thereon, wherein the computer program causes a computer to execute the following steps:

determining wireless communication throughput of a user equipment (UE) is lower than a threshold; and adjusting a cell measurement result of a serving cell, wherein the adjusted cell measurement result is used to steer the UE to a neighbor cell;

wherein the computer program further causes the computer to execute:

applying a specific offset to the cell measurement result of the serving cell without applying the specific offset to a cell measurement result of the neighbor cell to steer the UE away from the serving cell to the neighbor cell, according to the following formula (1):

$$M_{cell}' = M_{cell} + \text{Penalty Offset} \tag{1}$$

wherein $M_{cell}'$ is the adjusted cell measurement result, $M_{cell}$ is the cell measurement result of the serving cell, and Penalty Offset is the specific offset;

wherein the processor further executes:

activating a RAT disabling procedure when a handover command message is not received by the UE after transmitting a cell measurement report indicating low wireless communication throughput to a network entity for a period of time.

18. The non-transitory computer readable storage medium of claim 17, wherein the threshold is a specific threshold.

\* \* \* \* \*